United States Patent [19]

Valenzona

[11] Patent Number: 5,003,136
[45] Date of Patent: Mar. 26, 1991

[54] GAS STRUT SWITCH ASSEMBLY

[75] Inventor: Joseph F. Valenzona, El Toro, Calif.

[73] Assignee: Judco Manufacturing, Inc., Harbor City, Calif.

[21] Appl. No.: 453,401

[22] Filed: Dec. 18, 1989

[51] Int. Cl.⁵ .............................................. H01H 3/16
[52] U.S. Cl. ................................ 200/61.62; 200/82 D
[58] Field of Search .............. 200/52 R, 61.44, 61.62, 200/82 D; 307/119

[56] References Cited

U.S. PATENT DOCUMENTS

| Re. 30,663 | 6/1981 | Schnitzius | 200/61.62 X |
|---|---|---|---|
| 4,163,970 | 8/1979 | Allinquant et al. | 200/61.62 X |
| 4,263,488 | 4/1981 | Freitag et al. | 200/61.62 X |
| 4,316,098 | 2/1982 | Frietag et al. | 200/61.62 X |
| 4,317,014 | 2/1982 | Langanke | 200/61.62 |
| 4,400,600 | 8/1983 | Frietag et al. | 200/61.62 X |
| 4,667,940 | 5/1987 | Jaillet | 200/82 D X |

Primary Examiner—J. R. Scott
Attorney, Agent, or Firm—G. Norden Hanover

[57] ABSTRACT

An electrical switch adapted to be mounted on a gas strut assembly employed with a liftgate, for example, on an automotive vehicle. The switch is open or non-conducting when the strut is compressed and the liftgate is in the closed position. The switch is closed or conducting when the strut is extended enough to allow the liftgate to be unlatched and opened a predetermined distance as measured at the bottom of the liftgate. In one embodiment, the switch is affixed to the strut by an already existing fastener at the end of the strut that tightens the switch against a shoulder on the strut. In another embodiment, the switch fits snugly on the strut and is correctly positioned by the strut during initial assembly and actuation. Internally, the switch is provided with a pair of sleeve-like members that move longitudinally with respect to each other. One of the members has a pair of elongated contact fingers, while the other member is encircled by a metallic band. Movement slides the fingers onto and off of the band to make and break the electrical contact. The switch is completely enclosed to protect the contacts from corrosion, tarnishing and pitting due to exposure to the weather. Also, the sliding movement maintains the contacts polished.

11 Claims, 2 Drawing Sheets

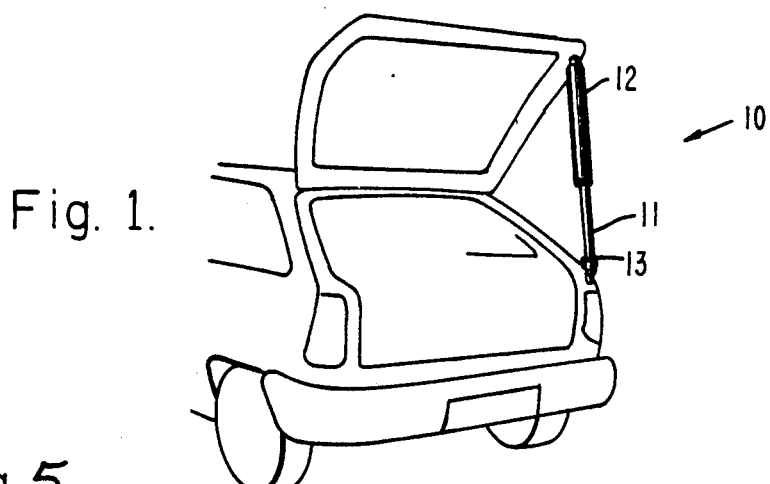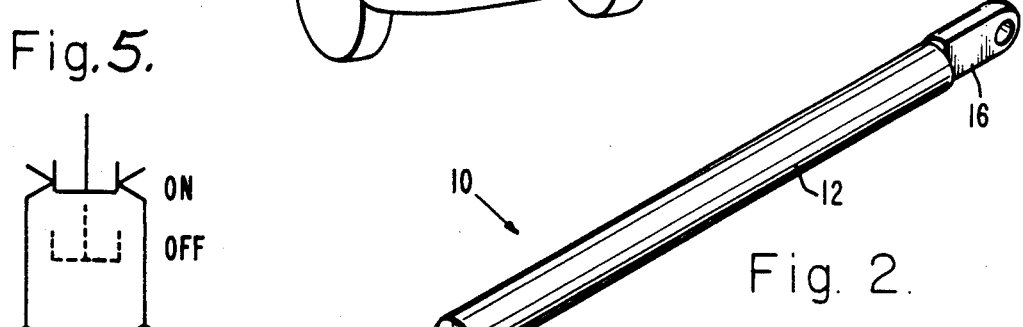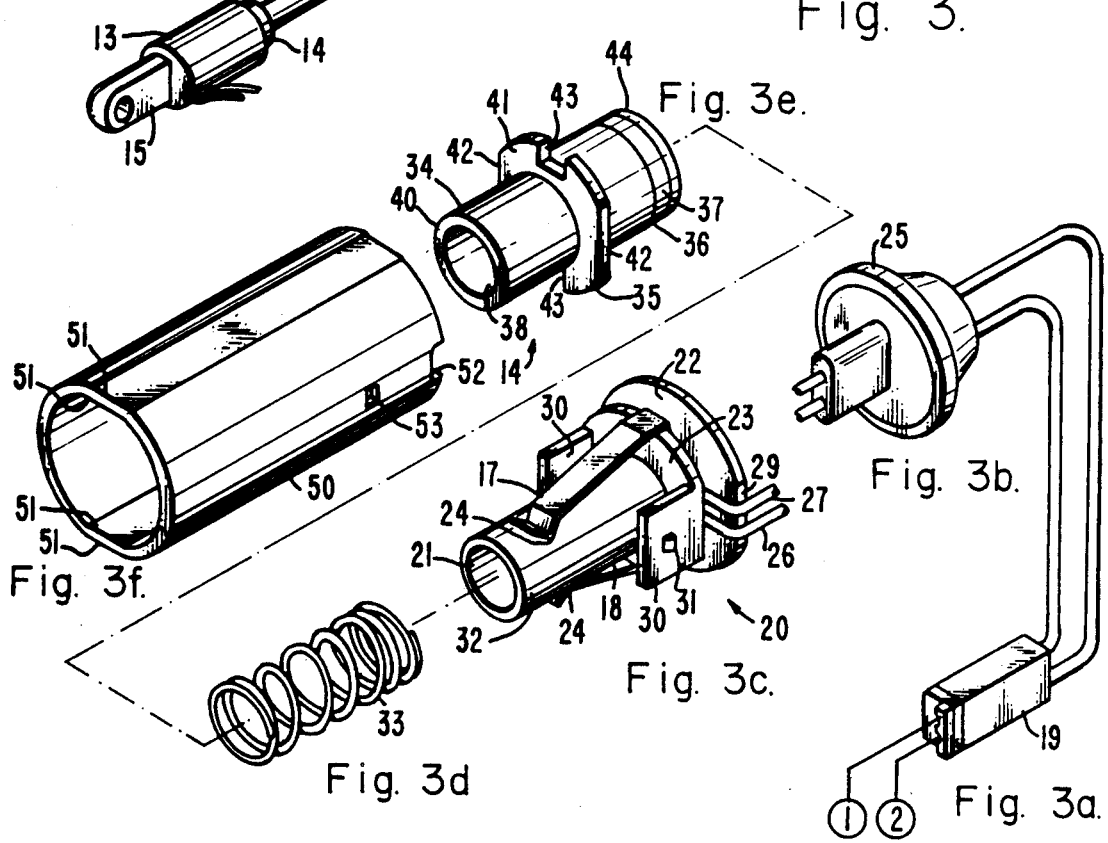

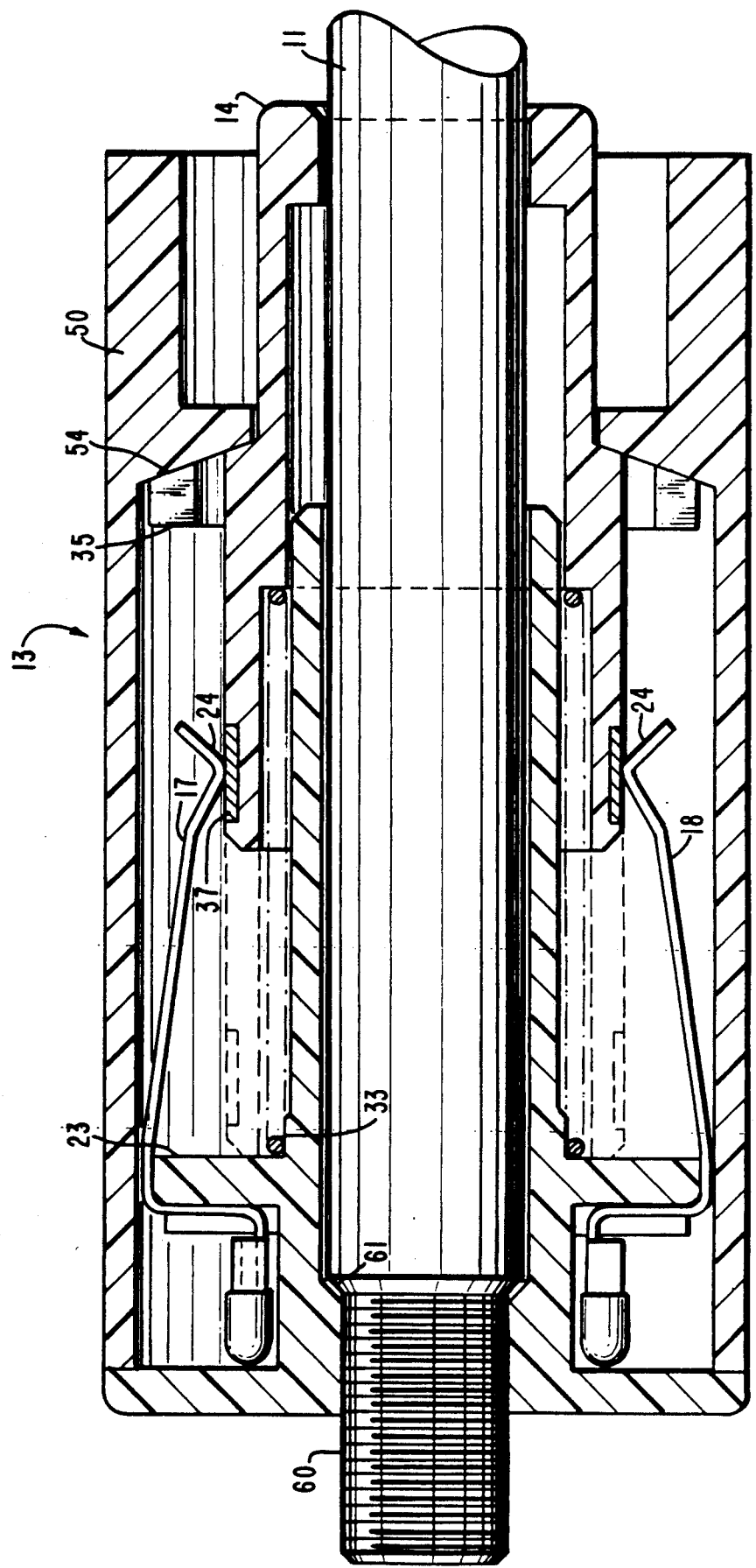

GAS STRUT SWITCH ASSEMBLY

BACKGROUND

The present invention relates to mechanically actuated electrical switches operating in conjunction with automobile doors and, more particularly, to electrical switches operating in conjunction with gas struts.

Conventional switch arrangements for automobile doors employ a mechanical push button switch mounted on the door frame so that the door, upon closing compresses a push-button which actuates the switch and which in turn operates interior lights, anti-theft systems, door ajar warning systems, etc. The current "hatch-back" or "lift-back" doors utilize large glass surfaces with designs that leave little or no accompanying frame to accommodate a switch. Furthermore, these doors are often supported by simple gas struts in door open positions. Incorporation of standard switches is difficult in these designs.

A further problem is that switches for hatch-back or lift-back doors must face exposure to weather conditions because these doors are sometimes left open. The switch may be exposed to tarnishing, rusting, oxidation, corrosion dampness and dirt that characterize the automobile exterior environment. In order to avoid the danger of dirty, tarnished and corroded contacts, the switch must include protective features. It is accordingly an objective of the present invention to provide a switch that does not need to be mounted in a door frame, and will thus not interfere with the expansive appearance of the large glass hatch-back and lift-back designs. Another objective of the invention is the provision of a switch that may be incorporated with the gas struts used as hatch-back lifting mechanisms. Furthermore, it is a goal of this invention to provide a switch that has general application to a large number of different automobile models, and thus free the designer from considerations relating to the switch. It is also a goal to provide a switch that does not interfere with the aesthetically pleasing open look of modern automobile design. It is further goal to provide a switch that is weather-proof.

SUMMARY OF THE INVENTION

In accordance with these and other objectives and advantages of the present invention, there is provided a mechanically actuated gas strut switch assembly that does not require installation within the structure of the door or its frame. The gas strut and switch assembly comprises a switch, a strut and a gas cylinder. The switch is cylindrical and fits over the strut between a fastener at the end of the strut and the cylinder into which the strut slides. The switch is responsive to mechanical compression in its longitudinal direction with the compression serving as the actuating means for the electrical contacts.

The switch includes two sleeves cooperating with each other in order to obtain the necessary mechanical motion underlying electrical switch action. The first sleeve provides support for two electrical contacts and the second sleeve provides a surface on which a metallic band is disposed. The electrical contacts extend from the first sleeve to reach the surface of the second sleeve. Relative motion between the two sleeves causes the electrical contacts to slide on to the metallic band in one position and to slide off the band in the other position, thus causing switch action. A coil spring provides pre-loading between the two sleeves, and an outer houses encases and weather proofs the switch.

In operation, the gas strut and switch assembly is fully extended when the door is open thus freeing the second sleeve to move into its extended position, hence causing electrical closure of the switch. As the door closes, the strut recesses into the cylinder thud reducing the space between the fastener at the end of the strut and the gas cylinder. This reduction of space provides the mechanical switch actuation. Thus, with the switch disposed in this space, the contraction causes mechanical compression of the second sleeve whereby the contacts move off the metallic band an electrically open the switch.

In another embodiment of the invention, the switch is affixed to the strut without employing a threaded fastener to lock it in place. Instead, the diameter of the elongated hold through the inner housing sleeve is made to have a close tolerance fit to the outer diameter of the strut. At installation, the switch is placed onto the strut, and is automatically positioned along the length of the strut when the gas strut switch assembly is actuated the first time. The switch will then remain at that position because of the tight or snug fit.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a perspective view of the rear portion of an automobile showing a lift-back rear door configuration incorporating an embodiment of a gas strut and switch assembly constructed in accordance with the present invention;

FIG. 2 shows the strut and switch assembly detached from the automobile in a partially extended position;

FIG. 3 comprising FIGS. 3a, 3b, 3c, 3d, 3e, and 3f is an exploded view of a switch forming a part of the gas strut and switch assembly shown in FIGS. 1 and 2;

FIG. 3a is an electrical connector for interconnecting the switch of FIG. 3 with circuits in an automotive vehicle;

FIG. 3b is a grommet and strain relief to provide for electrical wiring passing through a hole in an automotive vehicle body panel;

FIG. 3c shows an inner housing sleeve employed in the gas strut switch assembly of FIGS. 1 and 2;

FIG. 3d illustrates a helical compression spring that sits over the drum of the inner housing sleeve of FIG. 3c;

FIG. 3e shows a plunger that fits over the spring of FIG. 3d and the inner housing sleeve of FIG. 3c and provides the actuation element of the gas strut switch assembly of FIGS. 1 and 2;

FIG. 3f is an outer housing that encloses the switch of FIG. 3;

FIG. 4 is a side view in cross section of the assembled switch of FIG. 3 shown integrated into the gas strut and switch assembly of FIGS. 1 and 2; and FIG. 5 is a schematic of the electrical circuit of the switch of the present invention.

DETAILED DESCRIPTION

Referring now to FIG. 1 of the drawings, there is shown a perspective view of the rear portion of an automobile having a lift-back rear door or lift gate configuration incorporating an embodiment of gas strut and switch assembly 10 constructed in accordance with the principles of the present invention. FIG. 1 shows the rear door in an open position. This corresponds to the gas strut and switch assembly 10 opened to its fully extended position wherein the strut will support the rear door in an open position. As the rear door closes, the gas strut and switch assembly 10 becomes fully collapsed. The collapsing and extending of the gas strut and switch assembly 10 provides the mechanical movement that produces the desired electrical switch action.

Referring now to FIG. 2 of the drawings, the gas strut switch assembly 10 is shown detached from the automobile in a partially extended position. The gas strut and switch assembly 10 includes a strut 11 which is a metal rod that telescopes into a gas cylinder 12. An embodiment of an electrical switch 13 constructed in accordance with the principles of the present invention is adapted to fit snugly over the strut 11. The switch 13 has a plunger 14 to provide mechanical actuation thereof. In the gas strut and switch assembly 10, the strut 11 is a rod, generally made of steel, which is provided with a threaded end to accommodate a ball socket joint fastening means 15 for fastening it to the automobile. The gas cylinder 12 has an outer housing made of metal, and is also provided with a ball socket joint fastening means 16 at one end. The gas strut itself comprising the strut 11 and the gas cylinder 12 provides a helping force in lifting the door to open it and provides support in door open positions and also dampens door motion. The gas strut is standard equipment commonly used in automotive design and is commercially available.

Referring now to FIG. 3, there is shown an exploded view of the switch 13 which forms a part of the gas strut and switch assembly 10 of FIGS. 1 and 2. FIG. 3a and 3b shows a connector 19 and a grommet 25, respectively, which will be described more fully hereinafter. FIG. 3c shows one of the internal parts of the switch 13 which comprises an elongated inner housing sleeve 20 having a longitudinal hole 21 with an inner diameter slightly larger than the outer diameter of the strut 11. A generally circular end plate 22, having an outside diameter substantially exceeding that of the gas cylinder 12 (FIG. 2) and substantially defining the outside diameter of the switch 13, is located at one end of the inner housing sleeve 20. The end plate 22 serves to seal one end of the cylindrical switch 13. The longitudinal hole 21 is constricted in diameter where it passes through the circular end plate 22. As will be explained more fully hereinafter, the switch 13 is secured to the strut 11 by abutting the constriction in the end plate 22 against a should provided on the strut 11, and tightening the threaded fastening means 15 shown in FIG. 2 against the end plate 22.

A generally circular support flange 23 is provided on the inner housing sleeve 20 near the end plate 22 and has an outer diameter substantially smaller than the outer diameter of the end plate of the end plate 22 and has four flat portions spaced around the circumference thereof as a base for structural support members. The support flange 23 contains two radially extending flat grooves to provide structural support for two strip type metallic contact terminals 17, 18. The grooves are located on diametrically opposite sides of the support flange 23 on the circular face disposed adjacent to the end plate 22. The contact terminals 17, 18 are each provided with a dimple near one end that results in a press fit when they are inserted into the two radially extending flat grooves. The end of each of the contact terminals 17, 18 has a lug into which is crimped a wire 26, 27. The strip contact terminals 17, 18 are formed or bent at right angles at the point where they leave the flat grooves so as to extend longitudinally along the sides of the inner housing sleeve 20. The distal end of each of the contact terminals 17, 18 is found into a sliding contact finger 24, and the terminals 17, 18 are bent to bring the contact fingers 24 into close proximity to the side of the inner housing sleeve 20. A pair of rectangular fastening members 30 extend longitudinally from the outer periphery of the support flange 23 on diametrically opposite sides. They are positioned ninety degrees in rotation front the grooves holding the contact terminals 17, 18. The fastening members 30 are resilient to provide a cantilever spring action. Each fastening member 30 is provided with a projecting wedge lock 31 which is adapted to snap in to a matching hole in another part as will be described hereinafter. The projecting wedge lock 31 is wedge-shaped, having a slope up to an abrupt generally laterally-directed surface on the side facing toward the circular end plate 22.

The inner housing sleeve 20, including the circular end plate 22, the support flange 23, and the fastening member 30 with its wedge lock 31, typically may be made as a single integral part molded from a material such as polycarbonate plastic, although other insulating plastic materials may be used if desired. The contact terminals 17, 18 typically are made of spring tempered Phosphor Bronze or similarly conductive and resilient metals.

An elongated barrel portion of the inner housing sleeve 20 serves as a cylindrical inner housing drum 32 for a helical compression spring 33 shown in FIG. 3d. The helical compression spring 33 shown in FIG. 3d has an internal diameter substantially equal to the outside diameter of the inner housing drum 32. As viewed in the drawings, the spring 33 shown in FIG. 3d is adapted to slide over the drum 32 of the inner housing sleeve 20 shown in FIG. 3c. The spring 33 is adapted to seat up against the support flange 23. The spring 33 is installed in a partially compressed state so as to yield when an actuating force is applied and to spring back with a restoring force when the actuating force has been removed.

Referring now to FIG. 3e, there is shown the plunger 14 that provides the actuation element of the switch 13. The plunger 14 comprises a cylindrical sleeve having an elongated hole 38 adapted to be slipped over the strut 11, the inner housing drum 32 and the helical compression spring 33 and to be free to slide longitudinally from a compressed position to an extended position. The elongated hole 38 in the plunger 14 does not have a uniform inside diameter throughout its length. The variations of the inside diameter of the hole 38 in the plunger 14 are designed to utilize the strut 11 and the inner housing drum 32 as guides during the sliding actuation motion, and to extend over as well as to catch and engage the helical compression spring 33 so as to contain and maintain the spring 33 under partial compression. More particularly, the plunger 14 has an outer end 40 that is adapted to be engaged by the gas cylinder 12

(FIG. 2) to provide mechanical actuation of the switch 13. The internal diameter of the hole 38 at the outer end 40 is sized to provide a loose slip fit over the strut 11. Substantially midway through the hole 38 a ridge is provided to engage the spring 33 and the internal diameter of the hole 38 is sized from there on out to provide a loose slip fit over the spring 33.

The plunger 14 has a generally smooth outside surface forming a plunger drum 34 that extends from the outer end 40 to a plunger flange 35 located at about the middle of the plunger 14. The plunger flange 35 extends radially outward and is tapered on the forward face 41. It is provided with two diametrically opposite flats 42, and two diametrically opposed slots 43 located ninety degrees around the periphery with respect to the flats 42. The plunger 14 has a wide circular groove 36 completely around the outer surface adjacent to an inner end 44 of the plunger 14. The groove 36 is adapted to receive a wide metallic contact ring 37. The contact ring 37 may be made of any suitable conductive material such as half-hard Phosphor Bronze No. 521 or the like, for example. The end of the plunger 14 may be provided with one or more slots to make it resilient. In installation, the rigid ring 37 may be forced over the end of the plunger 14 which yields during installation. The ring 37 then snaps into the groove 36 and remains in place. The contact ring 37 is provided with a dovetail joint interlock at the ends thereof, the interlock being swaged to lock the ring 37 in place. The plunger 14 may be made of polycarbonate plastic or any other similar insulating plastic.

Referring now to FIG. 3f of the drawings, there is shown an outer housing 50 for the switch 13 employed in the gas strut switch assembly 10 of FIGS. 1 and 2. The outer housing 50 is formed as a hollow cylinder that is adapted to encapsulate and generally define the physical bounds of the switch 13. It is adapted to abut the end plate 22 of the inner housing sleeve 20 and has an outer diameter corresponding to that of the end plate 22 and therefore substantially exceeding that of the gas cylinder 12 (FIG. 2). The outer housing 50 is provided with elongated flat surfaces 51 on diametrically opposite sides of the interior and exterior thereof. A U-shaped notch 52 is provided in one flat surface 51 at one end of the outer housing 50. The notch 52 is adapted to permit passage of the wires 26, 27 (FIG. 3c) under the end plate 22. A pair of rectangular openings 53 are provided in the flat surfaces 51 near one end of the outer housing 50. The rectangular openings 53 are provided in the flat surfaces 51 near one end of the outer housing 50. The rectangular openings 53 are adapted to receive the wedge locks 31 (FIG. 3c) on the fastening members 30 of the inner housing sleeve 20. Thus, the inner housing sleeve 20 is adapted to slide into the outer housing 50 until the wedge locks 31 snap into place in the rectangular openings 53 and lock. The cylinder forming the outer housing 50 has an inside diameter sufficient to permit actuation of the plunger 14 but not completely receive the gas cylinder 12, thereby becoming a splash guard protecting the switch 13 against weather elements. The outer housing 50 may be molded of polycarbonate plastic or any other suitable material.

FIG. 4 shows the switch 13 installed on the strut 11 thus forming the gas strut and switch assembly 10. The switch 13 fits over the strut 11 and a threaded end 60 of the strut 11 and abuts snugly against a shoulder 61 of the strut 11. The switch 13 is secured onto the strut 11 by the ball socket fastening means 15 (FIG. 2) usually a ball socket which is adapted to serve both for fastening the switch 13 to the strut 11 as well as fastening the entire gas strut switch assembly 10 to the vehicle. The plunger 14 of the switch 13 is mechanically compressible in the longitudinal direction and is adapted to effect electrical switching upon compression and expansion.

FIG. 4 shows the switch 13 in its expanded position wherein the helical compression spring 33 is forcing the plunger 14 into the stops provided by the interaction between the plunger flange 35 and a housing flange 54 that projects radially inward from the internal wall of the outer housing 50. The internal surface of the housing flange 54 is tapered. In this position, the contact terminal 17, 18 make contact with the contact ring 37 and an electrical circuit is established between the contact terminals 17, 18. As the automobile lift gate closes, the strut 11 begins to collapse into the gas cylinder 12. Eventually, the gas cylinder 12 will touch the end of the plunger 14 and begin to apply force to collapse the switch 13. As this progresses, the contact fingers 24 at the end of the contact terminals 17, 18 will lose contact with the contact ring 37 and the electrical circuit will be broken. The collapsing motion is ultimately stopped when the plunger 14 abuts the support flange 23 of the inner housing sleeve 20. For reference, FIG. 5 shows a schematic of the electrical circuit of the switch 10 of the present invention.

In summary, it will be seen that there is provided a mechanically actuated gas strut switch assembly 10 that comprises a switch 13, a strut 11 and a gas cylinder 12. The switch 13 is cylindrical and fits over the strut 11 between fastening means 15 at the end of the strut 11 and the cylinder 12 into which the strut 11 slides. The switch 13 is respective to mechanical compression in its longitudinal direction with the compression serving as the deactuating means for the electrical contacts.

The switch 13 includes two elements that operate as sleeves cooperating with each other in order to obtain the necessary mechanical motion underlying electrical switch action. The first sleeve-like element is the inner housing sleeve 20 that provides support for two electrical contact terminals 17, 18 and the second sleeve-like element is the plunger 14 that provides a surface on which is embedded a metallic band or contact ring 37. The electrical contact terminals 17, 18 extend from the first sleeve to reach the surface of the second sleeve. Relative motion between the two sleeves causes the electrical contact fingers 24 to slide on the metallic band or ring 37 in one position or alternatively to slide off the band or ring 37 in the other position, thus causing switch action. A coil spring 33 provides pre-loading between the two sleeves, and an outer housing 50 encases and weather proofs the switch 13.

In operation, the gas strut switch assembly 10 is fully extended when the door is open thus freeing the second sleeve to move into its extended position causing electrical closure of the switch 13. As the door closes, the strut 11 recesses into the cylinder 12 thus reducing the space between the fastening means 15 at the end of the strut 11 and the gas cylinder 12. This reduction of space provides the mechanical switch actuation. Thus, with the switch 13 disposed in this space, the contraction causes mechanical compression of the second sleeve whereby the contacts move off the metallic band or ring 37 and electrically open the switch 13.

In another embodiment of the invention, the switch 13 is affixed to the strut 11 without employing a threaded fastener to lock it in place. Instead, the diameter of the elongated hole 21 through the inner housing sleeve 20 is made to have a close tolerance snug fit to the outer diameter of the strut 11. At installation, the switch 13 is placed onto the strut 11, and is automatically positioned along the length of the strut 11 when the gas strut switch assembly 10 is actuated the first time. The switch 13 will then remain at that position because of the tight or snug fit.

There has thus been described a mechanically actuated electrical switch 13 that is fully integrated with a gas strut to form a gas strut switch assembly 10. It is apparent that the switch 13 is completely separate from the door frame or any other underlying structures. The interfaces imposed by the gas strut fastening means 15, 16 are already present via the selection of the gas strut means of door support. The design of the door is therefore unencumbered by any significant limitations imposed by the design of the switch 13. The only interface is a hole with a grommet for providing access for the electrical wires leading to the switch 13.

It is also apparent that manufacturing costs are minimal in that they are limited to the manufacture of the switch 13 only. Final assembly of the strut thus implies slipping the switch 13 over the strut 11 and of fastening the switch 13 with the strut fastening means 15. Final assembly relative to installation on an automobile involves as an additional step only the fastening of wires by for example a connector.

Maintenance is unnecessary in that the switch 13 is self contained and a sealed unit. The effect of moisture bypassing the seal and tarnishing metallic parts is also minimized by a cleaning action of the continuously sliding switch contacts. Similarly, repair involves only the simple replacement of the switch 13 by removing the strut fastener 15, replacing the switch 13, retightening the strut fastener 15 and by reconnecting the electrical wires.

Thus there has been described a new and improved gas strut switch for automotive vehicles that does not need to be mounted in a door frame, and will thus not interfere with the expansive appearance of the large glass hatch-back and lift-back automotive designs. The switch of the present invention may be incorporated with the existing gas struts used as door props. Furthermore, this invention provides a switch that has general application to a large number of different automobile models and thus frees the structures designer from considerations relating to the switch. The switch of the present invention does not interfere with the aesthetically pleasing open look of modern automobile design. This novel switch is also weather proof.

It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A switch in combination with a telescoping damper system that comprises a gas cylinder having fastening means at one end and a strut in telescopic combination with the gas cylinder having strut fastening means at the other end, wherein the improvement comprises:
   a switch assembly disposed around the periphery of the strut near the strut fastener means, and having a mechanically compressible member that is responsive to compression of the strut into the cylinder, and having a fixed electrical contact and a movable electrical contact disposed therein that are responsive to the compression of the strut into the cylinder, and whereby actuation of the switch assembly is obtained in response to movement of the strut into and out of the cylinder.

2. The switch of claim 1 wherein the switch assembly further comprises:
   an inner housing sleeve extending over the strut, having an end plate at one end with a hole fitting over a threaded end portion of the strut and abutting a shoulder of the strut, and having a support flange near the end plate leaving a smooth inner housing surface for the remainder of the length of the inner housing.

3. The switch of claim 2 wherein the switch assembly further comprises:
   a helical compression spring disposed over the inner housing surface with one end abutting against the support flange.

4. The switch of claim 3 wherein the switch assembly further comprises:
   an actuator sleeve disposed over the strut, the internal housing and the helical spring, the actuator sleeve having an actuator shoulder that engages and compresses the helical spring for providing a mechanical switching motion ranging from fully compressed positions, said actuator sleeve having a smooth external surface and having an external flange disposed on said surface.

5. The switch of claim 4 wherein the switch assembly further comprises:
   an electrically conducting metallic member disposed on the external surface of the actuator sleeve.

6. The switch of claim 5 wherein the switch assembly further comprises:
   an outer housing fastened to the end plate of the inner housing sleeve and extending the length of the switch assembly, having a housing flange extending inwards so as to interact with the external flange of the actuator sleeve whereby the actuator sleeve is constrained in the extended position.

7. The switch of claim 6 wherein the switch assembly further comprises:
   a pair of metallic spring contacts fastened at one end to the support flange of the inner housing sleeve and extending towards and sliding against the external surface of the actuator sleeve, and contacting the metallic member when the actuator sleeve is in its extended position and sliding off the metallic member as the actuator sleeve begins to compress, thereby obtaining an electrical connection between the pair of metallic spring contacts in the extended position of the actuator sleeve and an electrical open circuit as the actuator sleeve compresses beyond the width of the metallic member.

8. A switch assembly for sensing the opening of a door comprising:
   a telescoping strut having a threaded, smaller diameter end forming a shoulder;
   a gas cylinder having fastening means at one end and the telescoping strut slidably coupled to the other end;
   an inner housing sleeve extending over the strut, having an end plate at one end with a hole fitting over the threaded end of the strut and abutting the shoulder thereof, the inner housing sleeve having a support flange substantially near the end plate and a relatively smooth inner housing surface for the remainder of the length of the inner housing;

a helical compression spring disposed over the inner housing surface with one end abutting against the support flange;

an actuator sleeve disposed over the strut, the internal housing and the helical spring, the actuator sleeve having an actuator shoulder that engages and compresses the helical spring for providing a mechanical switching motion ranging from extended to compressed positions, said actuator sleeve having a relatively smooth external surface and having an external flange disposed on said surface;

an electrically conducting metallic band disposed around the external surface of the actuator sleeve;

a cylindrical outer housing fastened to the end plate of the inner housing sleeve and extending the length of the switch assembly, the outer housing having a housing flange extending radially inwards so as to interact with the external flange of the actuator sleeve whereby the actuator sleeve is constrained in the extended position; and a pair of metallic spring contacts fastened at one end to the support flange of the inner housing sleeve and extending towards and sliding against an external surface of the actuator sleeve, and contacting the metallic band when the actuator sleeve is in its extended position and sliding off the band as the actuator sleeve begins to compress, thereby obtaining an electrical connection between the pair of spring contacts in the extended position of the actuator sleeve and an electrical open circuit as the actuator sleeve compresses beyond the metallic band.

9. On a gas damper assembly comprises a gas cylinder having fastening means on one end and a strut that is axially and telescopically slidable into the gas cylinder protruding from its other end, the strut having threads on its free end adapted to receive fastening means, wherein the improvement comprises a compressibly actuated electrical switch assembly disposed on the strut that comprises:

an inner housing having a first length and having an inside diameter such that the inner housing is slidable over the strut, and having a second shorter length approximately one half the length of the strut threads and having an inside diameter comprising female threads that mate with the strut threads, and having a circular end plate disposed at the threaded end of the inner housing and having an outside diameter extending across the switch assembly, and having a circular support flange disposed substantially near the end plate and having an outside diameter smaller than the diameter of the end plate, and having a sleeve portion defined by the support flange and the end of the inner housing assembly with the outside diameter of the sleeve portion adapted to support a spring;

a spring disposed over the inner housing surface with one end abutting against the support flange;

an actuator sleeve disposed over the strut, the internal housing and the spring, the actuator sleeve having an actuator shoulder that engages and compresses the spring for providing a mechanical switching motion ranging from fully extended to fully compressed positions, said actuator sleeve having a smooth external surface and an external flange disposed on the external surface;

an electrically conducting metallic band embedded in the external surface of the actuator sleeve;

a cylindrical outer housing fastened to the end plate of the inner housing sleeve and extending the length of the switch assembly, the outer housing having a housing flange extending radially inwards so as to interact with the external flange of the actuator sleeve whereby the actuator sleeve is constrained in the extended position; and a pair of metallic spring contacts fastened at one end to the support flange of the inner housing sleeve and extending towards and sliding against the external surface of the actuator sleeve, and contacting the metallic band when the actuator sleeve is in its extended position and sliding off the band so as the actuator sleeve begins to compress, thereby obtaining an electrical connection between the pair of spring contacts in the extended position of the actuator sleeve and as electrical open circuit as the actuator sleeve compresses beyond the width of the metallic band.

10. The switch of claim 9 wherein the inner housing further comprises:

an inner housing sleeve extending over the strut and disposed adjacent a shoulder located at the threaded end of the strut, having an end plate at one end with a hole fitting over the threaded end of the strut and abutting the shoulder, the inner housing sleeve having a support flange substantially near the end plate and a relatively smooth near the end plate and a relatively smooth inner housing surface for the remainder of the length of the inner housing.

11. A mechanically actuated electrical switch for a door having a telescoping damper system that comprises a gas cylinder having fastening means at one end for fastening to a door frame and a telescoping strut slidably disposed at the other end, and wherein the strut has one end telescoping into the cylinder and the other end comprising door fastening means, the cylinder and strut adapted to extend and compress to facilitate door opening and closing, the strut having a free space between the door fastening means and the proximal cylinder end wall when fully compressed, wherein the improvement comprises:

a switch assembly disposed around the periphery of the strut in the free space thereof that compressibly responds to movement of the strut into the cylinder, and wherein the compressed length of the switch assembly is substantially equal to the free space of the strut, and wherein the extended length of the switch assembly is longer than the free space of the strut to facilitate mechanical motion, the switch assembly having electrical contacts disposed therein responsive to the mechanical motion of the switch assembly, and whereby the movement of the strut into and out of the cylinder causes actuation of the electrical switch that produces a signal that is indicative of the opening and closing of the door.

* * * * *